UNITED STATES PATENT OFFICE.

WALTHER FELD, OF HÖNNINGEN-ON-THE-RHINE, GERMANY.

EXTRACTION OF AMMONIA FROM GASES.

No. 851,349.     Specification of Letters Patent.     Patented April 23, 1907.

Application filed January 18, 1907. Serial No. 352,878.

*To all whom it may concern:*

Be it known that I, WALTHER FELD, a subject of the King of Prussia and the German Emperor, of Hönningen-on-the-Rhine, in the Kingdom of Prussia and the German Empire, have invented certain new and useful Improvements in the Extraction of Ammonia from Gases, of which the following is a specification.

My invention has reference more especially to the process claimed in the specification of my United States Patent No. 830,983, and has for its object to extract ammonia in a satisfactory and efficient manner, in the form of ammonia salts (such, for instance, as sulfate of ammonia, or chlorid of ammonia), from gases containing ammonia—such, for instance, as coal gas and the like.

Hitherto such gases have been cooled to a low temperature, the ammonia being partly dissolved by the water condensed from the gases at this low temperature, the other part of the ammonia, left in the gases after the condensation of the water having afterwards been extracted from the said gases by treatment with fresh water. From the dilute ammonia liquors thus obtained, the ammonia was distilled and absorbed by acids. In order to obviate the necessity for this distillation process, the gases have been treated with sulfuric acid at such a temperature (usually above 70 degrees centigrade) that practically no water is condensed in the acid bath and the sulfuric acid is not diluted but the resulting sulfate of ammonia is contaminated with tarry matters and contains sulfur, sulfuric acid and other impurities.

According to my present invention, the ammonia is extracted from the gases by treating the gases with a liquor containing a calcium salt, which may be held entirely in solution, or partly in solution and partly in suspension, such, for instance, as chlorid of lime, sulfate of lime and the like. The impure sulfate of lime, as it occurs in nature and known in the trade as gypsum may be used and also the sulfate of lime obtained in many industries as a by-product. If this treatment were effected at a temperature above 70 degrees centigrade, the reaction would be slow and incomplete, and if it were effected after the gases have cooled to under the dew-point of the water in the gases, the resulting solution of ammonia salt would be so diluted that distillation and absorption in acids would be necessary to obtain concentrated ammonia products. I therefore subject the gases to a preliminary treatment whereby the tar and the water are first removed in such a way that practically no ammonia is condensed with either the tar or the water, and I then effect the extraction of the ammonia from the gases (from which the tar and water have been thus removed) by treating the said gases with a liquor containing a calcium salt. By the simultaneous reaction of the ammonia and the carbon dioxid in the gases upon the calcium salt, the corresponding soluble ammonia salt and insoluble carbonate of lime are formed. To complete the reaction, the gases must contain, for each two molecular proportions of ammonia, at least one molecular proportion of carbon dioxid. Should the gases contain an insufficient proportion of carbon dioxid, the proportion may be increased by passing air into the retorts in which the coal, or other gas-yielding material, is distilled, or water gas, or gases of combustion, or other gases containing carbon dioxid, may be added to the gases to be treated; and also the gases containing carbon dioxid may be subjected to the action of the liquor containing the calcium salt.

The following is an example of how my invention may be carried into effect, using the impure sulfate of lime, (known as gypsum), but I do not limit myself to this example, as I may use a calcium salt other than the impure sulfate and the proportions can be varied according to the nature of the gases to be treated and to the kind and concentration of the ammonia salts to be obtained.

The gases are first subjected to the treatment as described in the specification of my aforesaid United States Patent No. 830,983 or to equivalent treatment, whereby the tar and water are removed from the gases without absorbing ammonia. In order to get a concentrated solution of sulfate of ammonia, I mix 300 parts, by weight, of finely ground sulfate of lime with 700 parts, by weight, of water and the gases are treated with this liquor containing the sulfate partly in solution and partly in suspension after the tar and water have been removed from said gases as aforesaid. This treatment of the gases may be carried on in any suitable gas-washing apparatus. In order to extract all of the ammonia and to use practically all of the sulfate of lime in the absorption process, at least two such apparatus should be used, or one apparatus with at least two chambers can be used, the first chamber containing the nearly saturated solution of sulfate of ammonia, and the second chamber containing a fresh quantity of sulfate of lime held partly in solution and partly in suspension.

The apparatus I prefer to use is that described in the specification of my United States Patent No. 829,261, and containing several superposed chambers, or receptacles.

The fresh liquor containing sulfate of lime, partly in solution and partly in suspension, enters at the top, and the solution of sulfate of ammonia containing the precipitate of calcium carbonate together with any insoluble impurities contained in the sulfate of lime, leaves at the bottom. The gases pass through the apparatus in the opposite direction to that of the above liquor. By this treatment all the ammonia is absorbed and the saturated liquor, containing about 20 to 25 per cent. of sulfate of ammonia, is separated from the precipitate of carbonate of lime and evaporated to dryness. The resulting sulfate of ammonia is neutral and practically free from impurities. The carbonate of lime can be washed with water and the washing liquors, containing dilute sulfate of ammonia, can be used instead of water, for mixing with the ground sulfate of lime and thereby a more concentrated solution of sulfate of ammonia is obtained.

I claim as my invention—

1. The process of extracting ammonia from gases, which consists in first subjecting such gases to treatment by which tar and water are removed therefrom, and then effecting the extraction of the ammonia from the said gases by treating the said gases with a liquor containing a calcium salt.

2. The process of extracting ammonia from gases, which consists in first subjecting such gases to treatment by which tar and water are removed therefrom and then effecting the extraction of the ammonia from the said gases by treating the said gases with sulfate of lime held partly in solution and partly in suspension.

3. The process of extracting ammonia from gases, which consists in first subjecting such gases to treatment by which tar and water are removed therefrom, and then effecting the extraction of ammonia from the said gases by treating the said gases with gypsum, held partly in solution and partly in suspension.

4. The process of extracting ammonia from gases produced from materials which are such that the gases contain less than one molecular proportion of carbon dioxid to two molecular proportions of ammonia, the said process consisting in introducing air into the distilling retorts and then first treating such gases so as to remove the tar and water and then effecting the extraction of ammonia from the said gases by treating the said gases with a liquor containing a calcium salt.

5. The process of extracting ammonia from gases, produced from materials which are such that the gases contain less than one molecular proportion of carbon dioxid to two molecular proportions of ammonia, the said process consisting in introducing air into the distilling retorts and then first treating such gases so as to remove the tar and water and then effecting the extraction of ammonia from the said gases by treating the said gases with sulfate of lime, held partly in solution and partly in suspension.

6. The process of extracting ammonia from gases produced from materials which are such that the gases contain less than one molecular proportion of carbon dioxid to two molecular proportions of ammonia, the said process consisting in introducing air into the distilling retorts and then first treating such gases so as to remove the tar and water and then effecting the extraction of ammonia from the said gases by treating the said gases with gypsum, held partly in solution and partly in suspension.

7. The process of extracting ammonia from gases, produced from materials which are such that the gases contain less than one molecular proportion of carbon dioxid to two molecular proportions of ammonia, the said process consisting in first subjecting such gases to treatment by which tar and water are removed, and then effecting the extraction of ammonia from the produced gases by subjecting such gases to treatment with a liquor containing a calcium salt, together with gases containing carbon dioxid.

8. The process of extracting ammonia from gases, produced from materials which are such that the gases contain less than one molecular proportion of carbon dioxid to two molecular proportions of ammonia, the said process consisting in first subjecting such gases to treatment by which tar and water are removed, and then effecting the extraction of ammonia from the produced gases by subjecting the said gases to treatment with sulfate of lime, held partly in solution and partly in suspension, together with gases containing carbon dioxid.

9. The process of extracting ammonia from gases, produced from materials which are such that the gases contain less than one molecular proportion of carbon dioxid to two molecular proportions of ammonia, the said process consisting in first subjecting such gases to treatment by which tar and water are removed, and then effecting the extraction of ammonia from the produced gases by subjecting the said gases to treatment with gypsum, held partly in solution and partly in suspension, together with gases containing carbon dioxid.

In testimony whereof I have signed my name to this specification in the presence of two subscribing witnesses.

WALTHER FELD.

Witnesses:
 HENRY HASPER,
 WOLDEMAR HAUPT.